Dec. 3, 1929.　　　　G. M. THOMSON　　　　1,737,624
APPARATUS FOR THE PRODUCTION OF DENSE FOAM
Original Filed Dec. 20, 1926
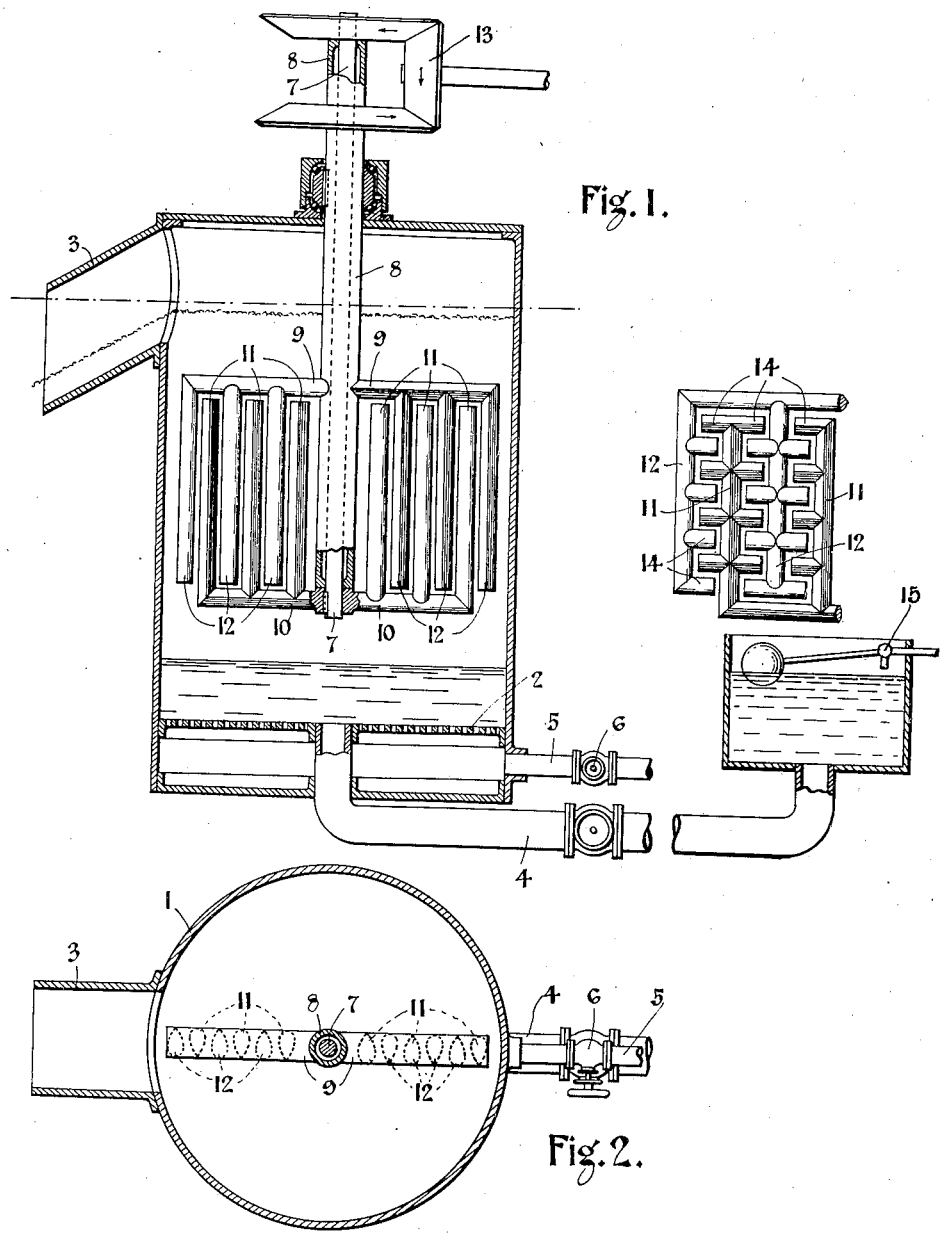
GEORGE MILLER THOMSON.
INVENTOR.
By Marks & Clark
ATTORNEYS.

Patented Dec. 3, 1929

1,737,624

UNITED STATES PATENT OFFICE

GEORGE M. THOMSON, OF CALEDONIA, ONTARIO, CANADA, ASSIGNOR TO CANADA GYPSUM AND ALABASTINE COMPANY, LIMITED, OF PARIS, ONTARIO, CANADA

APPARATUS FOR THE PRODUCTION OF DENSE FOAM

Original application filed December 20, 1926, Serial No. 156,059, and in Canada February 22, 1927. Divided and this application filed March 18, 1927. Serial No. 176,560.

This invention relates to an apparatus for the production of dense foam, such, for example, as is well adapted for the manufacture of cellular building materials, and is a division of my application Ser. No. 156,059, filed Dec. 20, 1926.

The production of foam in the usual sense is a simple and common occurrence, involving the inclusion of volumes of air within films of water to form bubbles, which accumulate in a mass of foam. In attempting, however, to produce a dense, homogeneous foam suitable for commercial use in the arts, unexpected difficulties were encountered and this invention is designed to overcome such difficulties and to produce in a simple, economical manner a foam well adapted to meet all the requirements of the arts.

The object of the invention is thus to provide a simple process and apparatus which may be operated continuously or periodically, as desired, to produce a homogeneous foam of any required density and having sufficient "body" to make it capable of withstanding the usage incident to its being formed into, or incorporated in, industrial products. Obviously such a foam must be so formed that the film surrounding the individual volumes of air will not be readily ruptured, that its density may be regulated in accordance with the specific requirements of the use to which it is to be applied and that the bubbles of which it is formed will be substantially uniform in size. Furthermore, in order that the foam may meet the requirements of the specific use to which it is to be applied, the process and apparatus for producing it must be subject to such control that the several characteristics required of the foam may be readily imparted to it by regulation of the operation of the process and apparatus.

For example, in the production of cellular building materials, such as wall-board or blocks, it is desirable that the cellular structure be homogeneous throughout, that is, that the size of the pores be substantially uniform and that they be uniformly distributed throughout the mass. In order that this uniformity in the material may be obtained, when using pre-made foam, the foam itself must be homogeneous and its denstiy must be regulated in accordance with the weight desired in the finished material. This invention however is directed to the production of the foam itself and not to the manner of using it.

Briefly stated the invention resides in a process and apparatus for the production of foam comprising passing air in regulated volumes into colloidized water and reducing the size of the bubbles formed in accordance with the density required in the foam produced.

The invention will now be described in detail, reference being made to the accompanying drawing, which illustrates by way of example one form of apparatus for operating the process and in which Figure 1 is a sectional elevation, Figure 2 is a plan view of the apparatus shown in Figure 1, Figure 3 is a fragmentary view of one of each set of vertical arms with additional agitating blades secured thereto.

The tank or chamber 1 has a perforated plate 2 located above its bottom and a discharge spout 3 near its top. The valve-controlled pipe 4 conducts suitably colloidized water from a source of supply and discharges the same into the tank immediately above the perforated plate. The pipe 4 is preferably connected with a water chamber containing a float-controlled valve 14. The pipe 5 having a valve 6 is connected to a source of air in which the pressure may be controlled as desired, and discharges into the zone beneath the perforated plate in the tank 1. The shaft 7 has secured to its lower end one or more horizontal arms 10, provided with vertical arms 11 and the hollow shaft 8 which surrounds shaft 7 carries one or more horizontal arms 9 which are likewise provided with downwardly projecting vertical arms 12. These shafts are rotated in opposite directions by any suitable means, as illustrated at 13. The vertical arms may be provided with horizontal blades 14 as illustrated in Figure 3.

All of the agitating arms or blades are made "stream-line" in shape, that is, each arm is tapered to a relatively sharp edge at the rear, as illustrated, particularly in Figure 2, for reasons to be described later.

The operation of the invention will now be described as follows:

Colloidized water, that is, water to which a colloid such as saponin, organic acids, aldehydes, sugar, etc., is added in the quantity required to impart a desired surface tension to the bubbles to be formed, is caused to flow into the tank 1 through pipe 4 until a depth of several inches, say three to five, of colloidized water rests upon the perforated plate 2. At the same time air from a suitable source of supply, under substantially constant pressure, is caused to flow through pipe 5, by regulation of valve 6, into the space in the tank below the perforated plate, through which it passes in fine streams and enters the colloidized water. Bubbles thus form in and rise to the surface of the water, where they accumulate in the form of a light foam, the bubbles being relatively large and substantially uniform in size.

The size of the bubbles formed depends on the size of the perforations in the plate 2 and the velocity of the air admitted through such holes. The smaller the perforations for a fixed air velocity, the smaller will be the bubbles formed. Likewise the less the velocity of air for perforations of constant diameter, the smaller will be the bubbles formed.

When the light foam thus formed rises to a point where it is engaged by the stirring or agitating device carried by the shafts 7 and 8, the bubbles are reduced in size to form a foam of the required density by the repeated agitating or cutting action of the arms 11, 12 and 14. As the foam rises it becomes more dense until it rises above the agitating device and it is later discharged through the spout 3.

The amount of reduction in size of the bubbles is directly related to the extent of agitating or cutting action of the arms and thus to the speed of the revolving arms and the duration of their action on the foam. The greater the angular velocity of the arms for a given period the smaller will be the resulting bubbles and the denser the foam.

The agitating arms are suspended above the surface of the colloidized water so that the water exerts an even pressure on the rising air currents. If the agitating arms entered the water, vacuum pockets might be formed, which would tend to produce zones of less pressure on the rising currents of air and thus air might escape entirely or varying sized bubbles might be formed.

The two sets of agitating arms travelling in opposite directions are used to minimize the effect of centrifugal force, which would tend to throw the foam outwards, leaving less depth of foam near the shaft and therefore less pressure downwards, permitting the larger bubbles to break through to the surface near the shaft, without being sufficiently reduced in size.

The discharge opening is located several inches above the top of the agitating arms so that a layer of foam forms a mat over the ascending foam and agitator, thus preventing air from being drawn in from the atmosphere to form unduly large bubbles during the final stage of agitation. It will be apparent that the bubbles constantly decrease in size during the action of the agitator, thus the density of the foam increases. In addition to acting as a mat to prevent inclusion of air from the atmosphere, this dense foam increases the downward pressure on the original large bubbles and facilitates their reduction in size under the action of the agitator.

As previously indicated the agitating arms or blades are given a "stream-line" contour, so that vacuum pockets are not formed as the arms rotate and thus no large bubbles are permitted to form and remain unreduced in size during agitation. For example, a rotating arm having a round or square rear edge would tend to produce a vacuum pocket, in which ascending large bubbles might be carried and thus avoid reduction in size.

It is necessary as previously stated to have the perforated plate completely covered with colloidized water, so that the air rising through the small perforations may always be caught and held as a bubble, by a film of water. Experience has shown that the water should be kept at a constant height in order that uniform results may be obtained.

For a given size of tank or cylinder maximum production is achieved by having the greatest number of the smallest possible perforations in the plate 2, which with a fixed air velocity permits relatively small bubbles to form initially, thus giving the agitator the least amount of work to do in reducing the size of the bubbles.

It will be apparent that a foam of a required density may be readily formed by simple regulation of the operation of the process and apparatus described.

I claim:

1. Apparatus for the production of foam comprising a chamber, agitating means in said chamber said agitating means comprising vertical arms, said arms having a streamline contour and means whereby said arms may be rotated, a perforated plate disposed in said chamber, means to admit air to the chamber beneath said perforated plate and means to admit water to said chamber above the perforated plate.

2. Apparatus for producing foam comprising a tank, a perforated plate disposed above the bottom of said tank, defining an air chamber at the bottom thereof, means for admitting air to said chamber, means for admitting water to the tank above said plate said last named means comprising a pipe passing through said chamber and plate, means for maintaining said water at a constant level, a foam outlet at the top of said tank, means disposed above said water and adapted to agitate said foam without substantially forming whirlpools in the foam, said agitating means comprising two sets of vertical arms and means whereby said sets of vertical arms may be rotated in opposite directions.

3. Apparatus for producing foam comprising a tank, a perforated plate disposed above the bottom of said tank, defining a chamber at the bottom thereof, means for admitting air to said chamber, means for admitting water to the tank above said plate and maintaining such water at a constant level, said last named means comprising a pipe passing through said chamber and plate, a foam outlet at the top of said tank, means to agitate said foam without substantially forming whirlpools in the foam, said agitating means comprising two sets of vertical arms and means whereby said sets of vertical arms may be rotated in opposite directions, each arm having a stream-line contour as and for the purpose described.

In testimony whereof I affix my signature.

GEORGE M. THOMSON.